US012151931B2

(12) United States Patent
Nelson et al.

(10) Patent No.: US 12,151,931 B2
(45) Date of Patent: Nov. 26, 2024

(54) MOUNTABLE PILLOW DECORATION ASSEMBLY

(71) Applicants: Darrell Nelson, N. Hollywood, CA (US); Erica Lee, N. Hollywood, CA (US)

(72) Inventors: Darrell Nelson, N. Hollywood, CA (US); Erica Lee, N. Hollywood, CA (US)

( * ) Notice: Subject to any disclaimer, the term of this patent is extended or adjusted under 35 U.S.C. 154(b) by 21 days.

(21) Appl. No.: 18/124,644

(22) Filed: Mar. 22, 2023

(65) Prior Publication Data

US 2024/0317573 A1 Sep. 26, 2024

(51) Int. Cl.

| | |
|---|---|
| ***B68G 13/00*** | (2006.01) |
| ***A47G 1/17*** | (2006.01) |
| ***F21V 23/04*** | (2006.01) |
| ***F21V 33/00*** | (2006.01) |

(52) U.S. Cl.

CPC ............... *B68G 13/00* (2013.01); *A47G 1/17* (2013.01); *F21V 23/04* (2013.01); *F21V 33/0028* (2013.01)

(58) Field of Classification Search

CPC ....... B68G 13/00; B68G 13/02; F21V 33/002; A47G 9/1027

See application file for complete search history.

(56) References Cited

U.S. PATENT DOCUMENTS 4,277,859 A 7/1981 Seaman
D275,436 S 9/1984 Zierden
4,776,121 A * 10/1988 Vicino ................ G09F 15/0025 40/624
5,345,633 A 9/1994 Harnish
5,475,886 A 12/1995 Mintz
5,652,983 A 8/1997 Kraemer
6,189,169 B1 2/2001 Marcotte
11,092,877 B2 * 8/2021 Ho .......................... F21V 3/026
2009/0141491 A1 * 6/2009 Chu ........................ F21V 3/023 362/231
2012/0120642 A1 * 5/2012 Sreshta ..................... F21L 4/08 362/183
2012/0224359 A1 * 9/2012 Chun ....................... B65D 7/24 362/183
2013/0335953 A1 * 12/2013 Gold ....................... F21V 3/026 362/190

(Continued)

FOREIGN PATENT DOCUMENTS

CN 201683557 U * 12/2010
CN 202104638 U * 1/2012
CN 102934930 A * 2/2013

OTHER PUBLICATIONS

Machine Translation of CN-202104638-U (Year: 2012).*

(Continued)

*Primary Examiner* — Leah Simone Macchiarolo

(57) ABSTRACT

A mountable pillow decoration assembly for mounting to a wall includes a pillow having an exterior wall enclosing a pillow having an exterior wall enclosing an interior space. A plurality of light emitters is coupled to the pillow and is actuated to emit light. A power supply is electrically coupled to the light emitters and is coupled to the pillow. A switch is electrically coupled to the power supply and powers on or off the light emitters. A mount is coupled to the pillow and is mountable to a wall.

7 Claims, 6 Drawing Sheets

(56) References Cited

U.S. PATENT DOCUMENTS

| | | | | |
|---|---|---|---|---|
| 2017/0202377 | A1* | 7/2017 | Jones | A47G 9/1045 |
| 2021/0254802 | A1* | 8/2021 | Weissman | F21V 3/02 |

OTHER PUBLICATIONS

Machine translation of CN-201683557-U (Year: 2010).*
Machine translation of CN-102934930-A (Year: 2013).*
Machine Translation of CN_102934930 (Year: 2013).*
CN_201683557 (Year: 2010).*
Machine Translation of CN_202104638 (Year: 2012).*

* cited by examiner

MOUNTABLE PILLOW DECORATION ASSEMBLY

CROSS-REFERENCE TO RELATED APPLICATIONS

I hereby claim the benefit under 35 U.S.C., Section 120 of U.S. application Ser. No. 17/966,326 filed Oct. 14, 2022

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to pillows and more particularly pertains to a new pillow for mounting to a wall.

(2) Description of Related Art Including Information Disclosed Under 37 CFR 1.97 and 1.98

The prior art relates to pillows and includes a variety of pillows providing visual decoration. Known prior art does not include a pillow being mountable to a wall to provide visual decoration.

BRIEF SUMMARY OF THE INVENTION

An embodiment of the disclosure meets the needs presented above by generally comprising a pillow having an exterior wall enclosing an interior space. A plurality of light emitters is coupled to the pillow and is actuated to emit light. A power supply is electrically coupled to the light emitters and is coupled to the pillow. A switch is electrically coupled to the power supply and is configured for powering on or off the light emitters. A mount is coupled to the pillow and is mountable to a wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
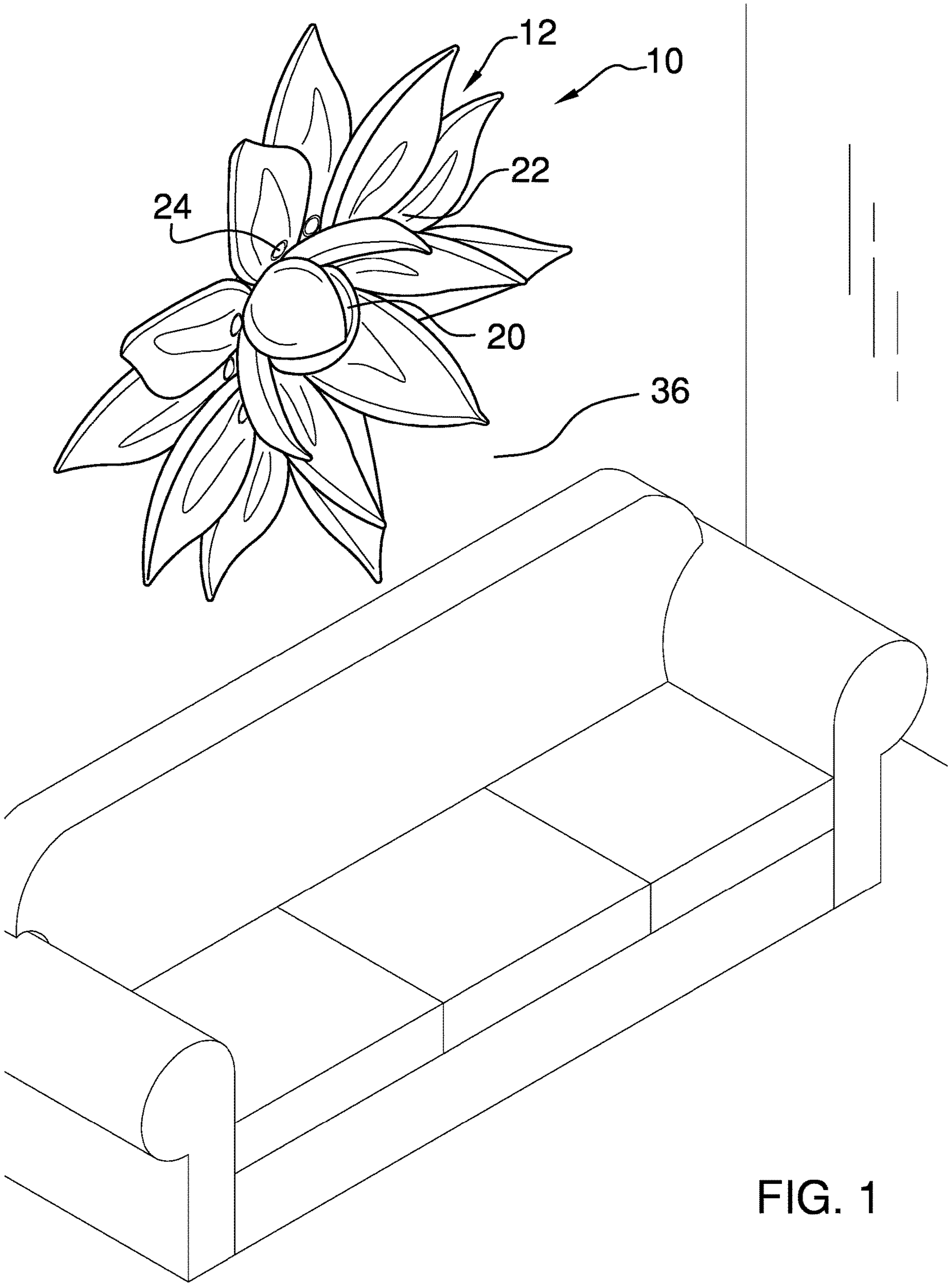
FIG. 1 is an in-use isometric view of a mountable pillow decoration assembly according to an embodiment of the disclosure.
Figure 2:
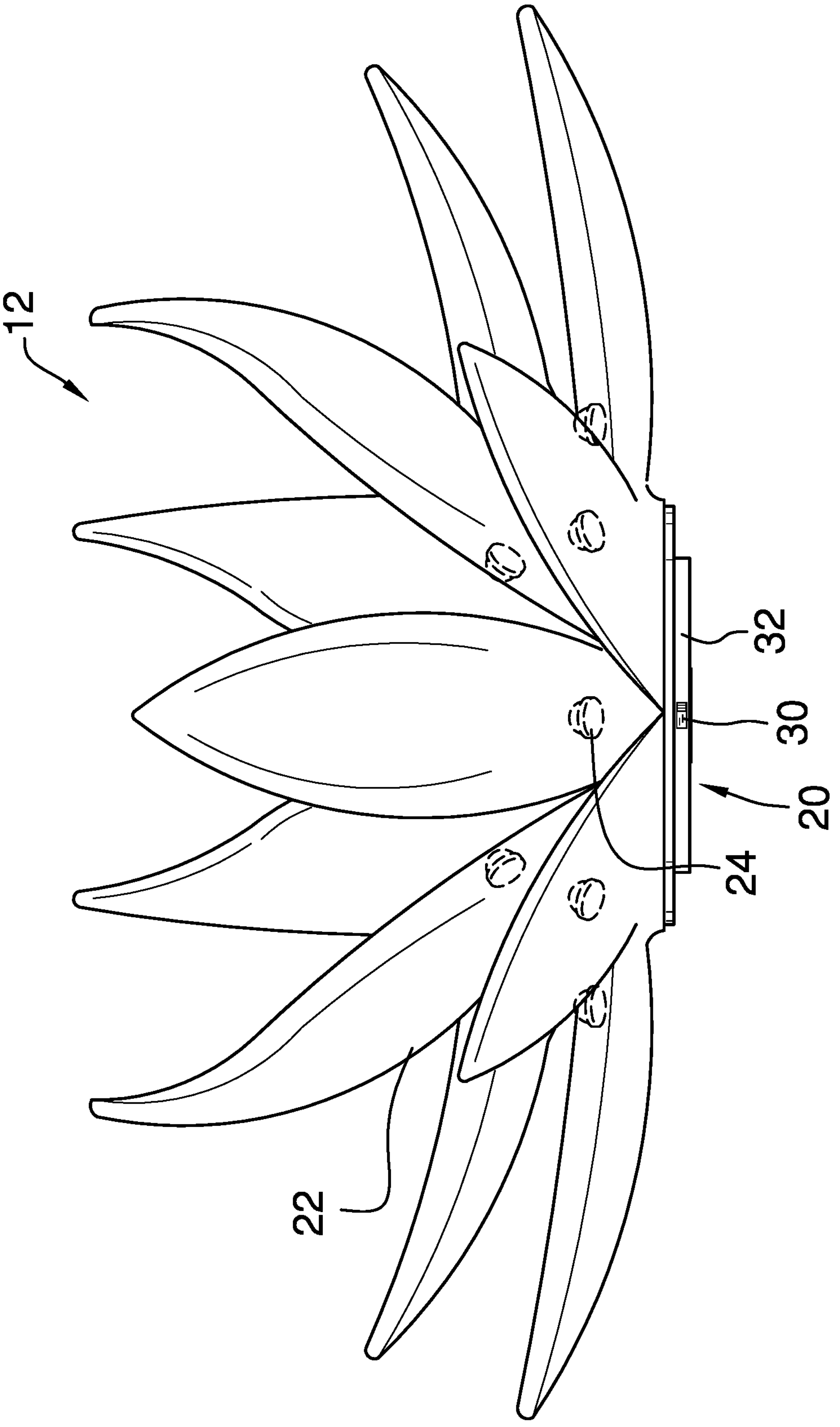
FIG. 2 is a front view of an embodiment of the disclosure.
Figure 3:
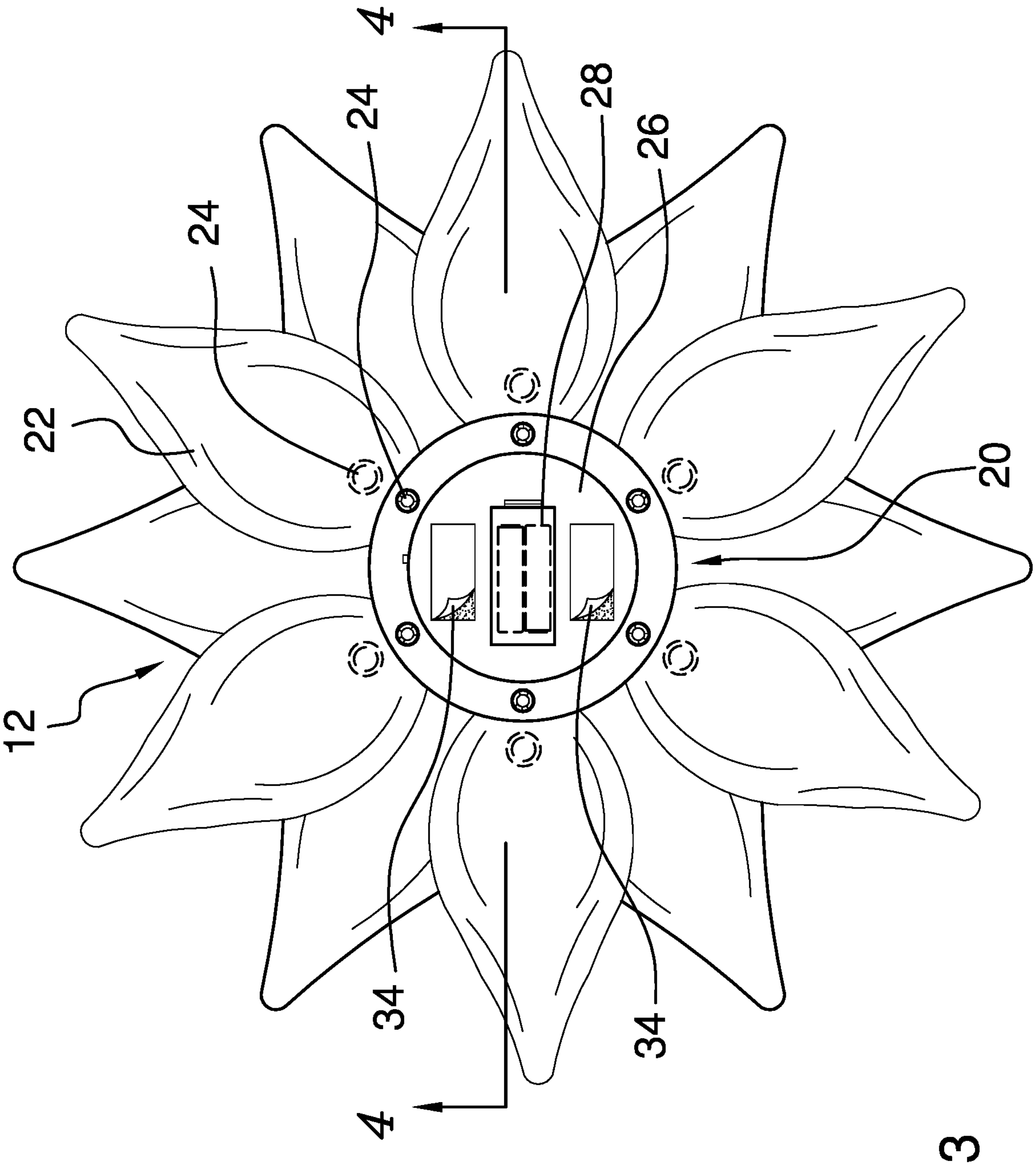
FIG. 3 is a bottom view of an embodiment of the disclosure.
Figure 4:
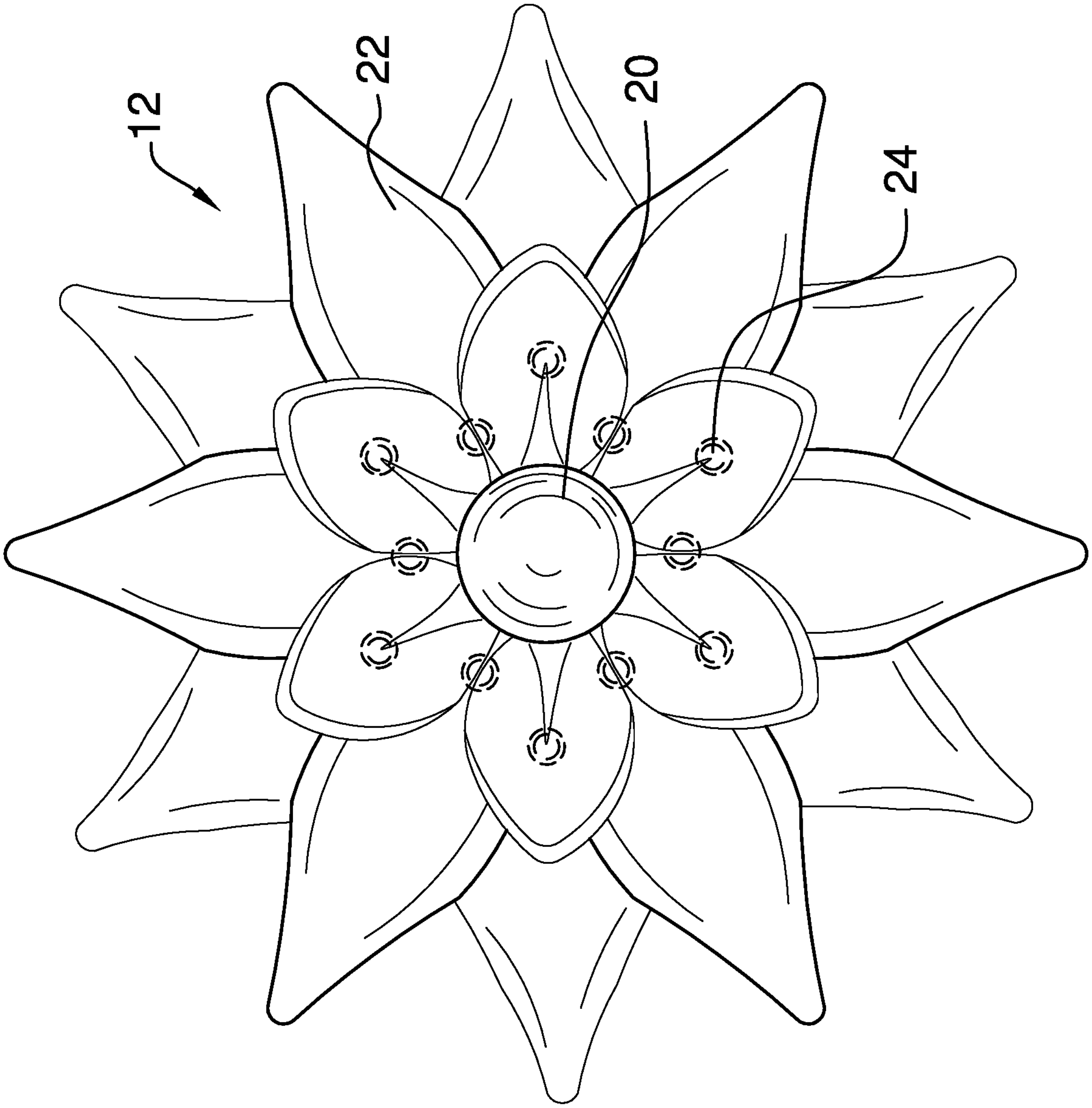
FIG. 4 is a top view of an embodiment of the disclosure.
Figure 5:
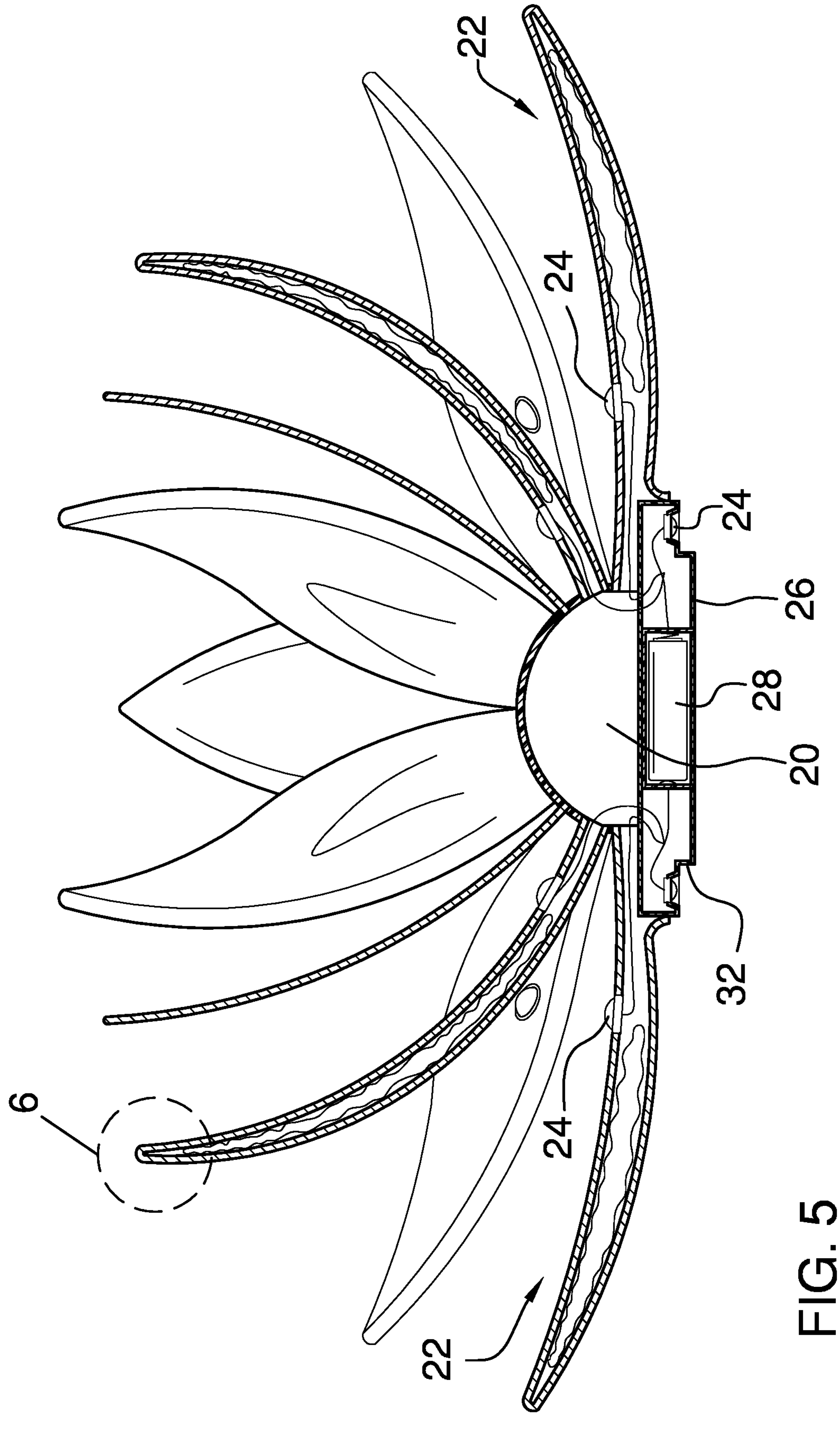
FIG. 5 is a cross-sectional view of an embodiment of the disclosure taken along Line 5-5 of FIG. 3.
Figure 6:
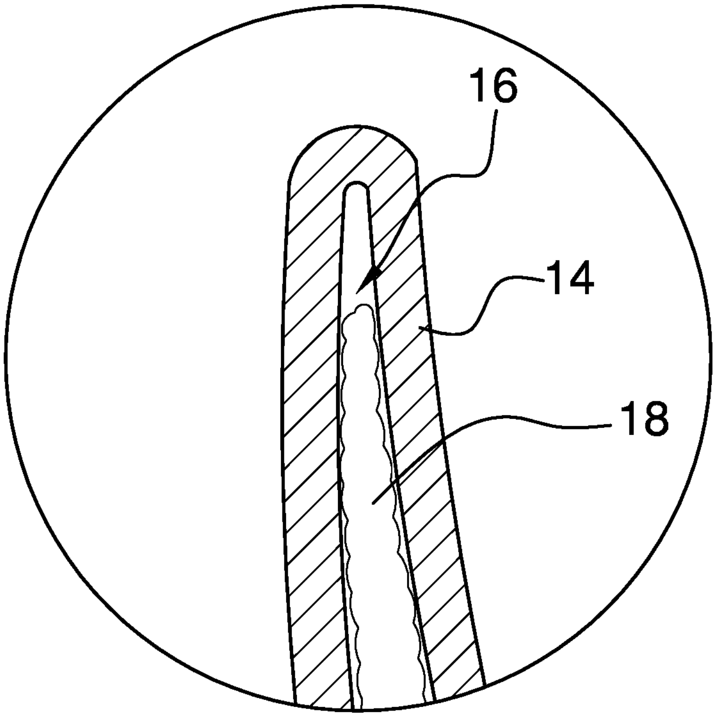
FIG. 6 is a detail view of an embodiment of the disclosure taken from Magnified Circle 6 of FIG. 5.

With reference now to the drawings, and in particular to FIGS. 1 through 6 thereof, a new pillow embodying the principles and concepts of an embodiment of the disclosure and generally designated by the reference numeral 10 will be described.

As best illustrated in FIGS. 1 through 6, the mountable pillow decoration assembly 10 generally comprises a pillow 12 having an exterior wall 14 enclosing an interior space 16. The exterior wall 14 typically comprises a fabric material such as cotton, silk, or any other fabric material for a conventional pillow 12. The interior space 16 of the pillow 12 may contain a filling 18 such as down pillow 12 filling 18, feather pillow 12 filling 18, polyester fiberfill pillow 12 filling 18, microbead pillow 12 filling 18, or any conventional pillow 12 filling 18. The pillow 12 includes a center section 20 and a plurality of petal-like protrusions 22 is coupled to and extends outwardly from the center section 20. The plurality of petal-like protrusions 22 is radially arranged about the center section 20 to define a flower head shape. The center section 20 may comprise a dome shape and each petal-like protrusion 22 of the plurality of petal-like protrusions 22 may comprise an oval shape.

A plurality of light emitters 24 is coupled to the pillow 12 and is actuated to emit light. The light emitters 24 are coupled to the petal-like protrusions 22 and to a bottom 26 of the center section 20 of the pillow 12. Each light emitter 24 of the plurality of light emitters 24 typically comprises a light emitting diode. A power supply 28 is electrically coupled to the light emitters 24 and is coupled to the pillow 12. The power supply 28 is normally positioned within the interior space 16 of the pillow 12. The power supply 28 may comprise a replaceable battery, a rechargeable battery, or any other conventional power supply 28. A switch 30 is electrically coupled to the power supply 28 and is configured for powering on or off the light emitters 24. The switch 30 may be positioned on a side 32 of the center section 20 of the pillow 12.

A mount 34 is coupled to the pillow 12 and is mountable to a wall 36, wherein the mount 34 mounts the pillow 12 to the wall 36. The mount 34 is typically positioned on the bottom 26 of the center section 20 of the pillow 12 and normally comprises at least one adhesive strip being removably mountable to the wall 36. The mount 34 may comprise another conventional mount.

In use, the mount 34 is coupled to the wall 36 wherein the mount 34 secures the pillow 12 to the wall. The switch 30 is actuated to power on the plurality of light emitters 24, wherein each light emitter 24 of the plurality of light emitters 24 emits light. The pillow 12 may be removed from the wall 36 and attached to another surface such as a window or a door.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

We claim:

1. A mountable pillow decoration assembly comprising:

a pillow having an exterior wall enclosing an interior space;

a plurality of light emitters being coupled to said pillow and being actuated to emit light;

a power supply being electrically coupled to said light emitters, said power supply being coupled to said pillow;

a switch being electrically coupled to said power supply and being configured for powering on or off said light emitters;

a mount being coupled to said pillow and being mountable to a wall;

wherein said pillow includes a center section and a plurality of protrusions being coupled to and extending outwardly from said center section, said plurality of protrusions being radially arranged about said center section to define a flower head shape; and wherein said light emitters are coupled to said protrusions and to a bottom of said center section of said pillow, each light emitter of said plurality of light emitters comprising a light emitting diode.

2. The mountable pillow decoration assembly of claim 1, wherein said exterior wall comprises a fabric material.

3. The mountable pillow decoration assembly of claim 1, wherein said power supply is positioned within said interior space of said pillow.

4. The mountable pillow decoration assembly of claim 1, wherein said switch is positioned on a middle structure of said center section of said pillow.

5. The mountable pillow decoration assembly of claim 1, said mount being positioned on said bottom of said center section of said pillow.

6. The mountable pillow decoration assembly of claim 1, wherein said mount comprises at least one adhesive strip being removably mountable to the wall.

7. A mountable pillow decoration assembly comprising:

a pillow having an exterior wall enclosing an interior space, said exterior wall comprising a fabric material, said pillow including a center section and a plurality of protrusions being coupled to and extending outwardly from said center section said center section, said plurality of protrusions being radially arranged about said center section to define a flower head shape;

a plurality of light emitters being coupled to said pillow and being actuated to emit light, said light emitters being coupled to said protrusions and to a bottom of said center section of said pillow, each light emitter of said plurality of light emitters comprising a light emitting diode;

a power supply being electrically coupled to said light emitters, said power supply being coupled to said pillow, said power supply being positioned within said interior space of said pillow;

a switch being electrically coupled to said power supply and being configured for powering on or off said light emitters, said switch being positioned on a middle structure of said center section of said pillow; and a mount being coupled to said pillow and being mountable to a wall, said mount being positioned on said bottom of said center section of said pillow, said mount comprising at least one adhesive strip being removably mountable to the wall.

* * * * *